Figure 1:
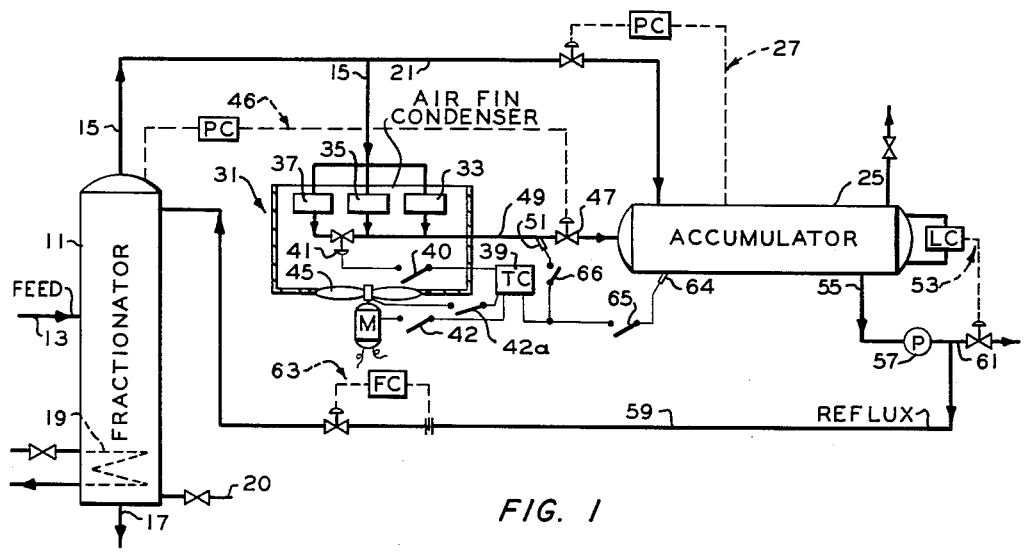

INVENTORS
C.J. SWEENEY
H.E. SULLENGER
BY *Hudson & Young*
ATTORNEYS

United States Patent Office 3,039,941
Patented June 19, 1962

3,039,941
METHOD AND APPARATUS FOR CONTROLLING A DISTILLATION SYSTEM
Cecil J. Sweeney and Henry Earl Sullenger, Phillips, Tex., assignors to Phillips Petroleum Company, a corporation of Delaware
Filed Mar. 24, 1958, Ser. No. 723,465
8 Claims. (Cl. 202—40)

This invention relates to control of fractional distillation. In one aspect it relates to control of still pressure as a step in maintaining a predetermined and constant operation. In another aspect it relates to apparatus and a method involving condensation of overhead vapors and regulation of the withdrawal of condensate into an accumulator maintained at a predetermined pressure as a means of controlling a fractional distillation column for the production of products of uniform compositions.

Prior fractional distillation art teaches use of back pressure regulators in overhead vapor lines at points relatively close to the fractionator for controlling fractionator pressure. It was believed that such means gave optimum fractionator control because the controller was placed at a point very near the fractionator. However, such back pressure regulators operate on vapor only and, as will be realized, a valve opened for the passage of gas allows relatively large volumes of gas to pass because of the low viscosity of a gas. Thus, when using back pressure regulators on vapor lines, the pressures within the stills fluctuate between relatively wide limits thereby causing more or less surging within the towers. From this point of view the compositions of overhead condensates will actually be weighted averages of compositions of the overhead vapors because of the surging.

Still operators and engineers have strived to obtain fractionator control which would eliminate the above mentioned surging or at least minimize it so as to be able to produce overhead products of truly uniform composition. As far as we are aware, surging in fractionating columns has not been eliminated. We believe that we have substantially eliminated such surging by regulating the rate of withdrawal of liquid condensate from the overhead condensers in response to column pressure rather than regulating the column pressure with a back pressure regulator in the vapor line.

Pressure on a fractionator frequently can not be controlled satisfactorily by controlling the back pressure on the overhead vapor stream after the stream has passed through the condenser because of variations in the degree of cooling obtained in the overhead condenser. Such variations are caused by abrupt atmospheric temperature changes, and variations in flow and temperature of the heat exchange medium to the overhead condensers. According to our invention we provide means for maintaining a constant pressure within the reflux accumulator and we obtain a constant fractionator pressure by regulating the rate of flow of overhead condensate into the reflux accumulator at a constant pressure in response to pressure within the fractionator. Thus, it is seen that when a reflux accumulator is maintained at a constant pressure, regulation of the flow of a liquid thereinto is easily controlled. Upon opening of a valve in the condensate line, relatively small volumes of fluid pass into the accumulator, thus providing small changes in pressure in the fractionator in contrast to large pressure changes when the back pressure regulator is disposed in the overhead vapor line to pass vapor only. Various refinements in this control involve regulation of the rate of removal of condensate from one or more sections of a multisection overhead condenser, and regulation of the rate of heat exchange, that is, passage of heat exchange medium in heat exchange relation with the overhead condenser. In one embodiment of our invention we provide finned air condensers as the overhead condensers and regulate the degree of heat exchange merely by regulating the speed of a fan blowing air over the condenser sections. In another embodiment the pitch of the fan blades is varied to regulate the rate of passage of cooling air over the condenser sections. Our invention is also applicable to the use of a cooling tower for cooling the overhead condenser sections in place of atmospheric cooling. In such a case, circulating water is sprayed over the condenser sections. Air is blown by a fan through the cooling tower to cool the water which is sprayed over the condenser sections. The degree of cooling is regulated by the r.p.m. of the fan, the pitch of the fan blades, and also the rate of spraying or circulation of the cooling water. For the most part, the rate of circulation of the cooling water can be substantially constant and the degree of cooling obtained by regulating the rate of evaporation of the water.

Our invention has particular utility in case of abrupt temperature changes such as occasioned by spring and summer thunderstorms, hail storms, and the like. In case of a rapid drop in atmospheric temperature, our apparatus restricts condensate flow from the condenser sections to allow build-up of pressure in the still to compensate for this undue condensation and cooling occasioned by the temperature drop.

An object of our invention is to improve fractional distillation operation.

Another object of our invention is to provide relatively simple means and method for maintaining constant pressures within fractional distillation columns so as to produce products of uniform compositions.

Still other objects and advantages of our invention will be realized upon reading the following description which, taken with the attached drawing, forms a part of this disclosure.

In the drawing FIGURE 1 illustrates a preferred embodiment of apparatus parts suitable for carrying out our invention.

Specifically, our invention comprises, in combination, a fractionating column, a condenser, said condenser having at least first and second condenser units, said condenser units being arranged for parallel operation, a vapor inlet and a condensate outlet from each unit, a reflux accumulator, a first conduit communicating the overhead product portion of said column with the vapor inlets of said condenser units, a second conduit communicating the condensate outlets of said condenser units with said accumulator, a by-pass conduit communicating said first conduit with said accumulator, a first back pressure regulator in said by-pass conduit for maintaining a constant pressure in said accumulator, a second back pressure regulator in said second conduit intermediate said condenser units and said accumlator for maintaining a constant pressure in said fractionating column, a temperature sensing device operatively in one of said second conduit and said accumulator, and means responsive to said temperature sensing device for regulating the heat exchange of at least one of said condenser units for regulating condensate temperature.

Furthermore, our invention comprises a fractional distillation operation wherein a vaporous overhead fraction and a liquid bottoms fraction are withdrawn from a fractional distillation zone, at least a portion of the vaporous overhead fraction being condensed to produce condensate and the remainder being uncondensed, a method for maintaining said zone under a predetermined operating pressure comprising maintaining a reflux accumulation zone under a predetermined pressure lower than the first-mentioned pressure by passing the uncondensed portion of said vaporous overhead fraction into said accumulation zone in response to pressure within said accumulation zone, passing liquid condensate from said accumulation zone into said distillation zone as reflux at a predetermined rate, introducing feed stock to be distilled and reboiling heat to said distillation zone at predetermined operable rates, and passing the produced condensate into said accumulation zone in response to pressure within said distillation zone.

Referring now to the drawing, and particularly to FIG. 1, reference numeral 11 identifies a more or less conventional fractional distillation column. This column is provided with conventional vapor-liquid contact promoting apparatus suitable for obtaining efficient contact between vapor and liquid, such as bubble cap trays. Pipe 13 is for inlet of feed to the column while pipe 15 is for removal of overhead vapors. A pipe 17 is for outlet of kettle material. Conventional practice dictates the need and use of a liquid level control system for regulating the rate of withdrawal of kettle product in response to the level of the kettle material within the column. Since such a liquid level control assembly is not a part of this invention, it will not be illustrated nor described, for brevity. The need and use for such a control is well understood by those skilled in the art.

Reference numeral 19 identifies a closed reboiler coil through which steam or other heat exchange medium is passed for reboiling the kettle liquid. A pipe 20 is illustrated for supplying open steam as a reboiling and stripping medium for the column, if desired. Ordinarily closed coil 19 and open steam from pipe 20 are not required simultaneously, but both are shown because under some conditions one is used and under other conditions the other.

Overhead vapor pipe 15 is manifolded so that portions of the overhead vapors pass into three sections, 33, 35, and 37, of an overhead condenser assembly 31. When such a condenser assembly is to be used as an atmospheric condenser, it is preferable that the condenser coils be provided with fins for improving the heat exchange between the atmosphere and the contents of the coils. Finned condensers are well-known in the condensation art and detail construction is believed not necessary. Condensate from these three heat exchange sections is manifolded to a common condensate pipe 49 which leads condensate into a reflux accumulator vessel 25, pipe 49 and vessel 25 being an accumulating means since condensate remains in both elements. A pipe 21 connects overhead vapor pipe 15 directly with the reflux accumulator 25 thereby by-passing the condenser assembly 31. Pipe 21 is provided with a back pressure regulator assembly 27 which is intended to operate in response to pressure within the accumulator 25. Accordingly, the back pressure regulator 27 is intended to maintain a predetermined pressure within the accumulator by opening and closing to regulate passage of small volumes of overhead vapors from pipe 21 into the accumulator.

A back pressure regulator assembly 46 is provided for regulating the rate of flow of condensate in pipe 49 in response to pressure within the upper portion of the fractional distillation column 11. Motor valve 47 is a portion of this regulator assembly and is a valve adapted specifically for passage of liquid. The accumulator 25 is provided with a pipe 55 for withdrawal of condensate under the influence of a pump 57 from the system as product through a pipe 61 or for passage through a pipe 59 into the upper part of the fractionator as reflux, or both. Ordinarily, if a feed stock is being distilled for the production of an overhead liquid product, condensate will be removed from the accumulator through pipe 61 with sufficient liquid being cycled as reflux through pipe 59. In order to maintain a predetermined rate of reflux passage to the column, a rate of flow controller assembly 63 is installed operatively in pipe 59. Flow rate controllers are conventional equipment obtainable from instrument supply houses, and the construction and operation of such will not be disclosed herein. A liquid level controller assembly 53 is provided in accumulator 25 to regulate the rate of condensate withdrawal through pipe 61 in response to the level of the liquid in the accumulator.

A temperature sensing element 51 is installed operatively in condensate pipe 49, or a temperature sensing element 64 is installed operatively in the accumulator tank 25 for sensing temperatures of liquid within pipe 49 or tank 25, respectively. These temperature sensing devices are operatively connected with the temperature controller 39 when their respective switches 66 or 65 are closed to operate a motor valve 41, with switch 40 being closed to control the rate of flow of condensate from condenser section 37. In order to maintain a more nearly predetermined temperature of reflux passing into fractionator 11, that is, if the temperature sensed by element 51 is too high, then temperature controller 39 actuates motor valve 41 to open somewhat motor valve 41 to allow more rapid withdrawal of condensate from condenser section 37 thereby providing a greater area for heat transfer for condensing vapor. Conversely, if the temperature sensed by temperature sensing device 51 is too low, which condition indicates that the area for heat transfer is too great, then the temperature controller 51 actuates motor valve 41 to throttle same to allow removal of condensate from condenser section 37 at a reduced rate thereby decreasing heat transfer for condensing vapor. This control provides for a constant temperature reflux which in turn will result in maintenance of substantially constant pressure in the column and therefore smoooth operation. The degree of pressure change occasioned by operation of the temperature sensing device 51 and motor valve 41 is very small. The motor valve 47, which is operated directly in response to pressure in the top of the fractionator, permits somewhat greater pressure corrections within the fractionator than those obtained from the temperature sensing device.

It is not necessary that the temperature sensing device be provided in pipe 49, but, if desired, the temperature sensing device 64, disposed within the accumulator 25, serves the same purpose. In other words, the temperature sensing device can be installed in pipe 49 or in accumulator 25, as desired.

These temperature sensing devices are ordinarily thermocouples, but they can be other suitable temperature sensing devices such as bimetallic combinations, resistance thermometers, or other suitable temperature sensing apparatus.

Furthermore, if desired, the temperature sensing device 51 or device 64 can, through the temperature controller 39 with switch 42 being closed, regulate the speed of fan 45 which, in this particular case, is illustrated as being a blower fan which blows or passes large volumes of atmospheric air over the condenser sections. The temperature controller 39 can, if desired, regulate the pitch of the blades of fan 45 by closing a switch 42a with the motor driving fan 45 running at constant speed.

Pressure within the reflux accumulating means 25 and 49 downstream from valve 47 is maintained by action of the back pressure regulator assembly 27. For pressure maintenance in this portion of the accumulator means only small volumes of overhead vapors are required. Thus the motor valve in by-pass pipe 21, as a part of the regulator assembly 27, is a relatively small valve. Motor valves 41 and 47 also are relatively small valves.

As is known, liquid or vapor flow is readily regulated when the pressure drop through the flow controlling apparatus is uniform, or substantially so. According to our invention we maintain a substantially constant pressure within the accumulator 25 so as to be able to regulate as accurately as possible the flow of condensate through motor valve 47. Thus, when the pressure of the liquid in pipe 49 upstream of motor valve 47 is substantially constant, and the pressure in accumulator 25 is a substantially constant somewhat lower pressure, then the liquid flow through motor valve 47 is very easily regulated. In this manner, we are able to control the pressure within the fractionating column 11.

The variables, such as rate of reflux return, rate of feed inlet and the rate of addition of reboiling heat are maintained as nearly uniform as possible. Thus, by maintaining these latter-mentioned flow rates constant or substantially constant, and by use of our invention for regulating overhead product condensation, we are able to maintain very uniform pressures within the fractionator.

Figure 2:
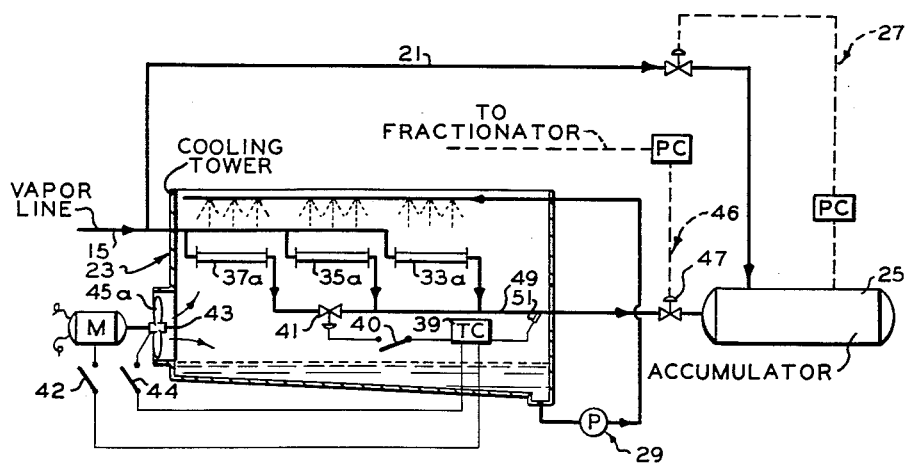

In the embodiment of our apparatus illustrated in FIGURE 2 the general outlay is more or less similar to that illustrated in FIGURE 1. The main difference is that condenser coil sections 33a, 35a and 37a are disposed within a cooling tower which is provided with water sprays for circulating water. A cooling water circulation assembly is identified by reference numeral 29 and this assembly includes a body of water in the bottom of the cooling tower, a pump with suitable inlet and outlet pipes and the above-mentioned water sprays.

Temperature sensing device 51, similar to that mentioned relative to FIGURE 1, is provided in the condensate manifold pipe 49. This temperature sensing device transmits a signal to the temperature controller 39 which, with switch 40 closed, actuates motor valve 41 to control rate of removal of condensate from condenser section 37a; or, with switch 42 closed, regulates the speed of a motor driven fan 45a; or, with switch 44 closed, regulates the degree of pitch of the blades of fan 45a by actuation of fan blade pitch actuator 43. The fan blade pitch actuator 43 is commercially available equipment obtainable from equipment supply houses and its construction and operation, therefore, need not be detailed. The condensate manifold 49 is illustrated as being connected with accumulator 25. The vapor by-pass line 21 connects the main overhead vapor line 15 with the accumulator 25, and this by-pass line is provided with a back-pressure regulator assembly 27 which operates in a manner similar to that explained relative to FIGURE 1.

Reference numeral 23 identifies this entire cooling tower assembly. The condensate manifold pipe 49 is provided with the motor valve 47 as a part of a back pressure regulator assembly 46 which regulates the flow of condensate in pipe 49 in response to pressure in the top of the fractionator. If desired, a temperature sensing device can be installed within accumulator 25 similar to temperature sensing device 64, as illustrated in FIGURE 1.

Our invention is particularly applicable to the distillation of hydrocarbon mixtures containing hydrocarbons boiling above the boiling point of normal butane. Since the main motor valve 47 of the pressure regulating system operates for passage of liquid, this valve can be much smaller than a valve disposed in the main overhead vapor line which obviously would be required to pass large volumes of vapor. Thus, with the smaller motor valve 47, the cost of this motor valve is much less than the cost of a motor valve required for installation in vapor pipe 15.

An example of the operation of our invention is the following tabulation:

| Component | Pentane splitter still | | | | |
|---|---|---|---|---|---|
| | Feed | | Overhead product, M g.p.d. | Kettle product | |
| | Vol. percent | M g.p.d. | | Liquid vol. percent | M g.p.d. |
| n-C$_4$ | 7.2 | 23.9 | 23.9 | | |
| Neopentane | .2 | 0.6 | .6 | | |
| i-C$_5$ | 46.0 | 152.9 | 132.7 | 11.6 | 20.2 |
| n-C$_5$ | 46.0 | 152.6 | .8 | 87.3 | 151.8 |
| Cyclohexane | .6 | 2.0 | | 1.1 | 2.0 |
| | 100.0 | 332.0 | 158.0 | 100.0 | 174.0 |

In producing the above overhead and kettle products from the C$_4$–C$_5$ feed stock, the temperature was about 186° F.; the overhead vapor withdrawal temperature was 168° F. at a pressure of about 60 p.s.i.g. (pounds per square inch gage). The reflux accumulator was maintained at 120° F. and 30 p.s.i.g.; the overhead condenser outlet was 120° F. and 31 p.s.i.g.; reflux to column 120° F., and the kettle was maintained at 190° F. and 67 p.s.i.g. The volume of reflux returned to the column was 1350 M g.p.d. (thousand gallons per day); kettle product was 174 M g.p.d.; the overhead product was 158 M g.p.d.; while the the feed rate was 332 M g.p.d. The column was a 70 tray column, with the feed being introduced to the 23rd tray from the bottom.

The temperature sensing elements, pressure controllers, temperature controllers, motor valves, and the like, as used in our invention, are all conventional equipment obtained from instrument supply houses and accordingly their construction and operation need not be given.

As will be evident to those skilled in the art, various modifications of this invention can be made, or followed, in the light of the foregoing disclosure and discussion, without departing from the spirit or scope thereof.

While certain embodiments of the invention have been described for illustrative purposes, the invention obviously is not limited thereto.

We claim:

1. In a fractionation system, the improvement comprising, in combination, a fractionating column, a condenser, said condenser having at least first and second condenser units, a vapor inlet to and a condensate outlet from each unit, a first conduit communicating the overhead product portion of said column with the vapor inlets of said condenser units, an accumulating means comprising an accumulator vessel and a second conduit communicating the condensate outlets of the condenser units with said accumulator vessel, a by-pass conduit communicating said first conduit with said accumulating means, a first back pressure regulator in said second conduit of said accumulating means for regulating pressure in said fractionating column, a second back pressure regulator in said by-pass conduit for regulating pressure in said accumulating means downstream of said first back pressure regulator as regards direction of flow of condensate, a temperature sensing device operatively disposed in said accumulating means, and means responsive to said temperature sensing device for regulating flow of condensate from at least one condenser unit to said accumulating means thereby regulating condensate temperature.

2. The system of claim 1 where said means responsive to said temperature sensing device for regulating the flow of condensate from said one of said condenser units comprises a motor valve disposed operatively in said accumulating means intermediate the outlets of said first and second condenser units, and control means responsive to said temperature sensing device for actuating said motor valve.

3. The system of claim 1 wherein said means responsive to said temperature sensing device for regulating flow of condensate from at least one of said condenser units comprises a fan for moving air in heat exchange relation with said one of said condenser units, a source of power for actuating said fan, and a control means responsive to said temperature sensing device for regulating said fan.

4. The system of claim 1 wherein said mean responsive to said temperature sensing device for regulating flow of condensate from at least one of said condenser units comprises a fan for moving air in heat exchange relation with said one of said condenser units, a source of power for actuating said fan, a water spray for spraying water in heat exchange relation with said one of said condenser units, and a control means responsive to said temperature sensing device for regulating said fan.

5. In a fractionation system, the improvement comprising, in combination, a fractionating column, a condenser, said condenser having at least first and second condenser units, a vapor inlet to and a condensate outlet from each condenser unit, a first conduit communicating the overhead product portion of said column with the vapor inlets of said condenser units, an accumulating means comprising an accumulator vessel and a second conduit communicating the condensate outlets of said condenser units with said accumulator vessel, a by-pass conduit communicating said first conduit with said accumulator vessel, a first back pressure regulator in said by-pass conduit for maintaining a constant pressure in said accumulator vessel, a second back pressure regulator in said second conduit for maintaining a constant pressure in said fractionating column, a temperature sensing device operatively disposed in said second conduit and means responsive to said temperature sensing device for regulating the rate of flow of condensate from one of said condenser units for regulating condensate temperature.

6. In a fractionation system, the improvement comprising, in combination, a fractionating column, a condenser, said condenser having at least first and second condenser units, a vapor inlet to and a condensate outlet from each condenser unit, a first conduit communicating the overhead product portion of said column with the vapor inlets of said condenser units, an accumulating means comprising an accumulator vessel and a second conduit communicating the condensate outlets of said condenser units with said accumulator vessel, a by-pass conduit communicating said first conduit with said accumulator vessel, a first back pressure regulator in said by-pass conduit for maintaining a constant pressure in said accumulator vessel, a second back pressure regulator in said second conduit for maintaining a constant pressure in said fractionating column, a temperature sensing device operatively disposed in said accumulator vessel and means responsive to said temperature sensing device for regulating the rate of flow of condensate from one of said condenser units for regulating condensate temperature.

7. In a fractional distillation operation wherein a vaporous overhead fraction and a liquid bottoms fraction are withdrawn from a fractional distillation zone, at least a portion of the vaporous overhead fraction being condensed in a pair of condensing zones operated in parallel to produce a first condensate and a second condensate and the remainder being uncondensed, a method for maintaining said distillation zone under a predetermined operating pressure comprising maintaining a reflux accumulation zone under a predetermined pressure lower than the first mentioned pressure by passing the uncondensed portion of said vaporous overhead fraction into said accumulation zone in response to pressure within said accumulation zone, passing a portion of the liquid condensate from said accumulation zone into said distillation zone as reflux at a predetermined rate, introducing feed stock to be distilled and a reboiling heat exchange medium into said distillation zone at predetermined operable rates, combining the first and second condensates, regulating the temperature of the combined condensates at a predetermined temperature by regulating the rate of withdrawal of condensate from one of said condensing zones in response to the temperature of the combined condensate, and passing the combined condensate into said accumulation zone in response to pressure within said distillation zone.

8. In the operation according to claim 7, passing air over said pair of condensing zones as a heat exchange medium, further regulating the temperature of the combined condensates by regulating the rate of flow of air over said pair of condensing zones.

References Cited in the file of this patent
UNITED STATES PATENTS

| | | |
|---|---|---|
| 2,236,035 | Luhrs | Mar. 25, 1941 |
| 2,341,433 | Fisher | Feb. 8, 1944 |
| 2,357,113 | Houghland et al. | Aug. 29, 1944 |
| 2,588,303 | Stanley | Mar. 4, 1952 |
| 2,697,587 | Conison | Dec. 21, 1954 |
| 2,709,678 | Berger | May 31, 1955 |
| 2,764,536 | Hutchins | Sept. 25, 1956 |
| 2,813,594 | Gantt | Nov. 19, 1957 |
| 2,915,462 | Salmon | Dec. 1, 1959 |